United States Patent Office 3,417,668
Patented Dec. 24, 1968

3,417,668
FLUID FLOW CONTROL VALVES
Thomas G. Lawson, Birmingham, England, assignor to Girling Limited, Birmingham, England, a British company
Filed Mar. 4, 1966, Ser. No. 531,854
Claims priority, application Great Britain, Mar. 5, 1965, 9,377/65
14 Claims. (Cl. 91—376)

ABSTRACT OF THE DISCLOSURE

A valve arrangement, particularly for servo boosters, comprising first and second co-axial valve seats and first and second valve elements arranged for cooperation with the respective valve seats, there being a press-fit connection between the valve elements which allows one of said elements to rock relative to the other thereof; a servo-booster incorporating said valves also including a lost motion connection whereby an inner thrust member connected to an output member may be mechanically picked up by an outer sleeve connected to the input member whereby the members may be operated mechanically in the event there is failure of fluid pressure for operating the booster, the lost motion connection comprising a radial pin on the outer sleeve extending into an annular recess on the inner sleeve, the annular recess having a greater width than the pin.

---

Figure 1:
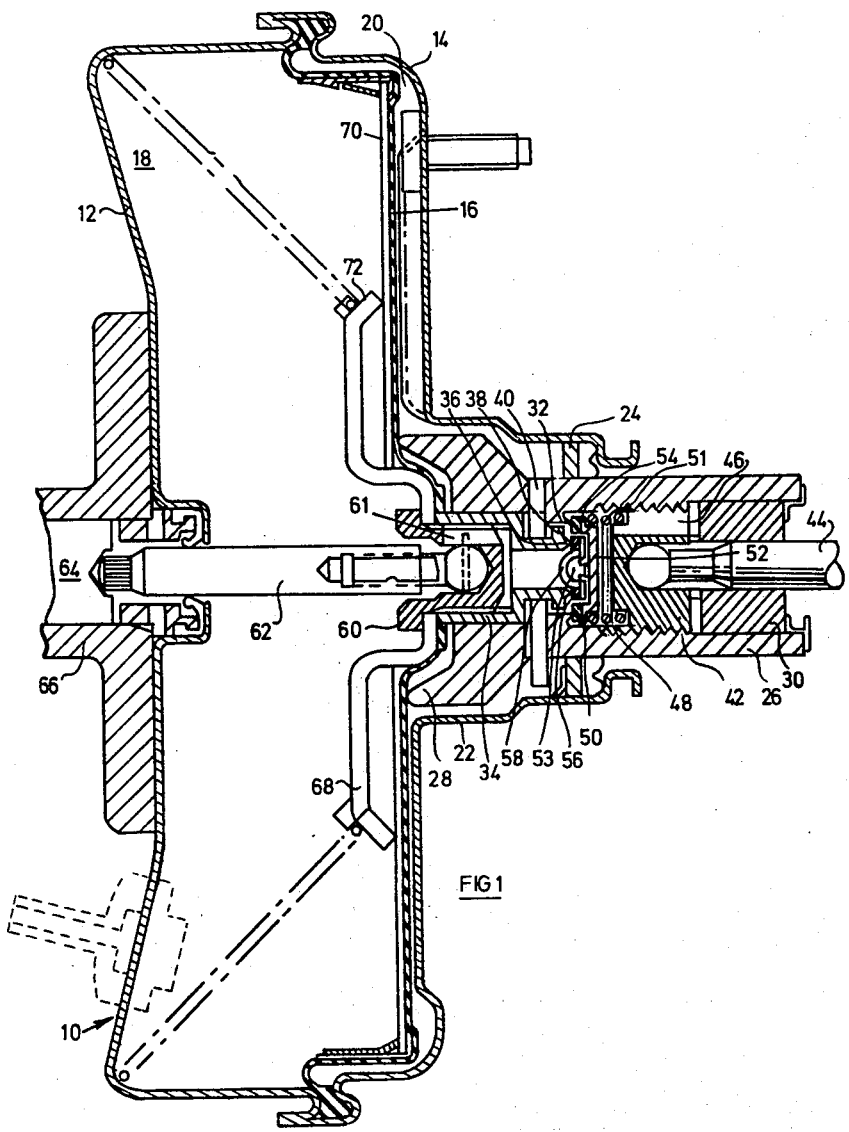

This invention concerns fluid flow control valves and relates more especially to fluid flow control valves for use in controlling the operation of servo motors such as the mechanical and hydraulic boosters employed in many vehicle brake actuating systems.

In many servo motors wherein the motor output is delivered by a movable wall separating a pair of fluid chambers of which one is arranged to be selectively connected to sources of differential fluid pressures to operate the motor, the connection of that chamber to said pressures is controlled by a coaxial valve assembly comprising a pair of coaxially arranged valve seats co-operating with a common valve closure member, and one operational condition of the valve assembly requires that the closure member shall close against both seats simultaneously. However, particularly where the construction is such that the two valve seats are to be slidable relative to one another, and one valve seat is to be guided within the other, manufacturing tolerances and other considerations render it very difficult to ensure that the sealing faces of the valve seats are invariably accurately parallel to one another and also to the valve closure member, with the result that situations can arise wherein efficient closure of both valves together is not achieved.

According to the present invention a coaxial fluid flow control valve assembly comprising a pair of coaxially arranged valve seats and a common closure member, in which the latter is of two-part construction, each one of said two parts being arranged for co-operation with a separate one of said pair of valve seats, said two parts being connected by a press-fit connection, which connection allows relative rocking or tilting of one of said parts relative to the other. By virtue of this construction, when the valve closure member moves against the valve seats, any non-parallel condition which may arise between the sealing faces of the latter is compensated by a slight rocking movement of the one valve closure member part relative to the other; thereby ensuring proper sealing of both parts against their respective seats.

According to one embodiment of the invention a coaxial fluid flow control valve assembly comprising a pair of coaxially arranged valve seats and a common closure member in which said common closure member comprises a dished annular carrier member presenting a resilient face for sealing against one of said valve seats and a resiliently faced disc for co-operation with the other of said valve seats and having a central dimple which engages as a rockable press-fit over an upstanding central stud formed on said annular carrier member.

According to a further embodiment of the invention a coaxial fluid flow control valve assembly comprising a pair of coaxially arranged valve seats and a common closure member, in which said common closure member comprises a first valve closure member arranged for co-operation with one of said pair of valve seats, a second valve closure member arranged for co-operation with the other of said pair of valve seats and connected to said first closure member by a shank and a press-fit connection, said other valve seat being formed in a seating member having a valve orifice therein, said valve orifice being disposed around said shank, and said press-fit connection allowing relative rocking or tilting of said first and second valve closure members.

The press-fit connection may be for example of ball and socket construction.

According to a further feature of the invention, a servo motor comprising a pair of fluid chambers separated by a movable wall which delivers the motor output has one of those chambers connectable to sources of differential fluid pressures by a fluid flow control valve as defined in one or other of the preceding paragraphs hereof, and the input to said motor is arranged to effect relative displacement between said valve seats for selectively placing said one chamber in communication with said fluid pressure sources.

Yet another feature of the invention is to provide in a servo motor of the type having a work performing member and a fluid pressure controlling member movable relative to the work performing member to control the flow of fluid pressure to the servo motor, an improved mechanical lost motion connector to permit normal operation of said fluid pressure controlling member over an initial range of relative movement between the controlling and work performing members, but on further movement beyond said range is effective to mechanically connect the control member to the work performing member for direct transmission of mechanical effort between the two.

Figure 2:
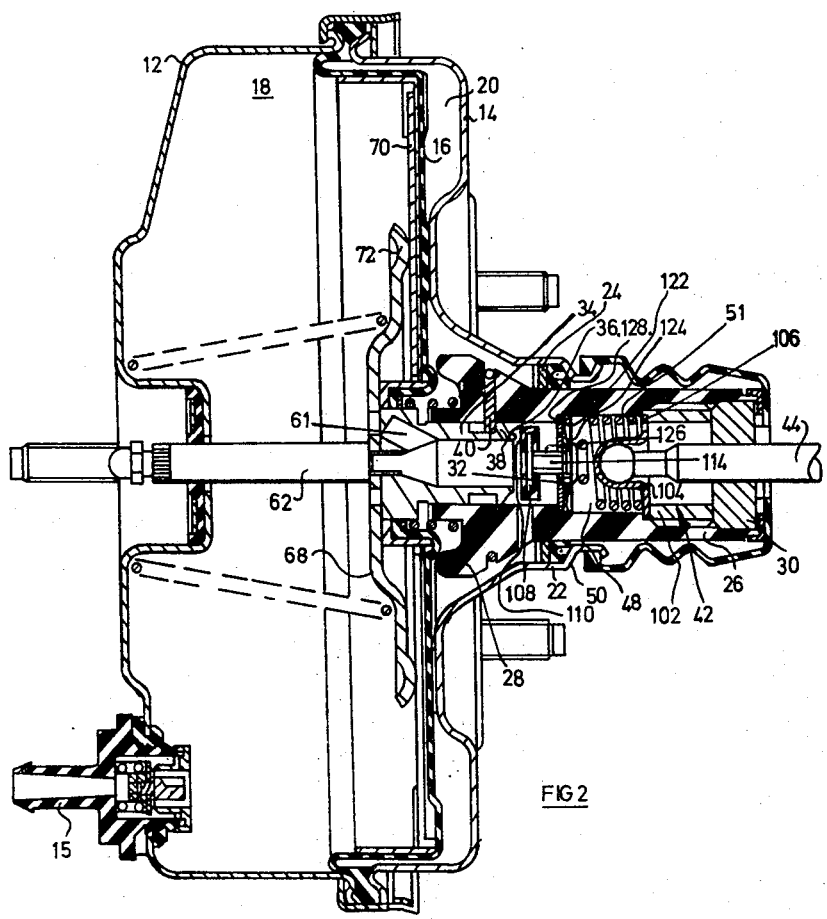
Figure 3:
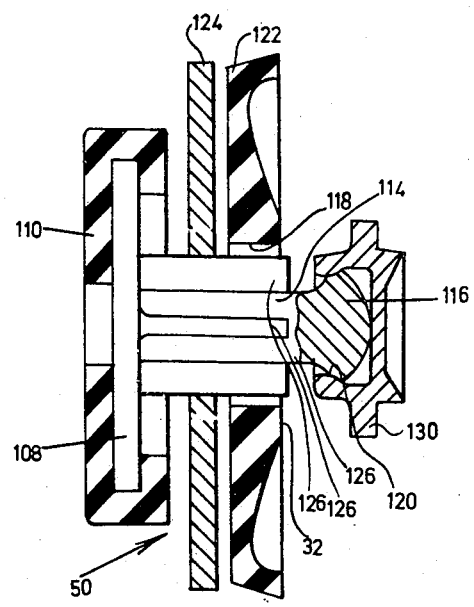

The invention will be described further, by way of example with reference to the accompanying generally diagrammatic drawings, of which FIG. 1 is an axial section through a mechanical booster embodying one form of the invention and intended for use in a vehicle braking system;

FIG. 2 is an axial section through a mechanical booster embodying another form of the invention and intended for use in a vehicle braking system; and FIG. 3 is an enlarged sectional view of the valve closure member of the booster of FIG. 2.

In the booster shown in FIG. 1 of the drawings, the interior of a generally cylindrical housing 10 defined by a pair of shells 12 and 14 is divided by an elastic diaphragm 16 into a pair of fluid chambers 18 and 20, the periphery of the diaphragm being clamped between the shells as indicated. The shell 14 has an outwardly directed, axial boss 22 which towards its outer end is provided with a radial bearing 24 for a tubular sleeve 26 having a flared inner end 28 of enlarged diameter and with its other end extending out of the boss 24 and closed by an axially open air filter 30. Intermediate its ends, the sleeve 26 is internally formed with a conical valve seat 32, whilst at its flared inner end 28 it engages in coaxial sliding relation over the larger diameter part of a stepped inner sleeve member 34 whose outer end terminates in a second conical valve seat 36. Behind the valve seat 36, the sleeve member 34 is formed with a radially outwardly directed shoulder 38, and into the annular space or recess 39 defined between this shoulder 38 and the step in the sleeve 34 there projects abutment means which may be in the form of a pin or pins 40 extending radially inwardly through a suitable opening or openings in the outer sleeve 26 and projecting into the recess 39 which has a greater width than the abutment 40, the side of the recess adjacent the diaphragm 16 affording a second abutment means adapted to cooperate with the first abutment means afforded by the radial element or pin 40. This arrangement provides for lost motion between the sleeves 26, 34 while limiting the extent of axial sliding movement of one sleeve with respect to the other.

The end of the sleeve projecting out of the boss 22 is internally threaded to receive a blind, hollow nut 42 within which is adapted to seat the ball end of an input rod 44 displaceable by a brake pedal (not shown), the nut 42 being formed with at least one through passage 46. Within the space 48 between the inner end of the nut 42 and the coaxial valve seats 32 and 36 there is arranged a closure member 50 for the valve seats. As illustrated, the valve closure member 50 comprises a dished, annular carrier member 52 presenting a resilient front face 54 for sealing against the valve seat 32, and a similarly faced disc 56 having a central dimple 58 which engages as a rockable press-fit over an upstanding central stud 53 of the carrier member 52. As will be noted, when the disc 56 is press fitted on to the stud 53, a clearance remains between the disc and the facing surfaces of the carrier member 52 in order to allow rocking motion of the disc to take place if necessary.

At its larger diameter, inner end, the inner sleeve member 34 is internally threaded to receive a blind, hollow nut 60 formed with at least one through passage 61 and providing a seat for the ball end of a push rod 62 adapted to engage the piston 64 of the master cylinder 66 of a conventional hydraulic brake system. Between the nut 60 and the inner end face of the sleeve member 34 there is clamped a dished plate 68 arranged within the fluid chamber 18 and providing a measure of support for the inner end of the disphragm 16, which will be seen to engage in sealing relation on the sleeve member 34. A deformable annular plate 70 is arranged between the diaphragm 16 and a peripheral lip 72 of the outer annulus of the dished plate 68.

In the operation of the booster shown in FIG. 1 of the drawings, with the brake pedal released and the input member 44 in its most retracted position, the outer sleeve 26 of the valve assembly is similarly in its most retracted position and the outer part 52, 54 of the valve closure member 50 is held by means of a valve spring 51 in space 48 against the valve seat 32, while the inner valve closure part 56 is held away from the seat 36. Under these circumstances, since the fluid chamber 20 communicates with the interior of the boss 22, it is further connected with the chamber 18 by way of the open inner valve 36, 56, the interior of the sleeve 34 and the passage 61 in the nut 60, and both chambers 18 and 20 are connected to vacuum through a vacuum connection (not shown) on the shell 12. In this condition, the booster is said to be vacuum suspended.

When the brake pedal is pressed, the input member 44 moves to the left in the drawing, taking the sleeve 26 with it, and a stage is eventually reached at which both parts of the valve closure member 50 engage against their respectively co-operating seats 32, 36, when the two fluid chambers 18 and 20 are isolated from one another. This is the condition illustrated in the drawing. Thereafter, upon further depression of the brake pedal, the sleeve 26 is moved so far to the left that, although the inner valve 36, 56 remains closed, the outer valve 32, 54 is opened, thus connecting the chamber 20 with atmospheric pressure through the interior of the boss 22, the open valve, space 48 and the passage 46 in the nut 42. The chamber 18 remains connected to vacuum through the vacuum connection and a pressure differential is thus created between the two sides of the elastic diaphragm 16.

The elastic diaphragm 16 thus moves to the left and together with the input applied to the member 44, applies a brake operating force to the master cylinder piston 64. It will be noted that, should the booster fail to operate, a braking force is still transmitted to the piston 64 by the input member 44, through the radial abutment 40 after the lost motion afforded by the recess 39 has been taken up. It will also be appreciated that, while the braking force is being applied as discussed above, the deformable plate 70 will fulcrum about the lip 72 of the dished plate 68. This lip 72 is arranged to be radially inside the annulus representing the centre of pressure on the diaphragm 16, with the result that, when the plate deforms, there is a reaction fed back to the input member 44 through the outer sleeve 26 which indicates to the operator the degree to which the booster has been energised; in other words, it provides what is commonly known as "feel."

The operation of the booster is rendered particularly efficient by virtue of the particular construction described of the valve closure member 50. It will be clear that the braking force available from the booster is dependent upon the maintenance of adequate vacuum in the fluid chamber 18 and that this in turn demands an operating sequence in which the chamber 18 is closed (that is to say, the two chambers 18 and 20 are isolated from one another) before the chamber 20 is opened to atmosphere. For this purpose, it is essential that, in the operational condition illustrated in the drawing, the two valves 32, 54 and 36, 56 shall both close efficiently. However, this cannot be achieved with a common valve closure member unless the two coaxial valve seats 32 and 36 are accurately coplanar, or at least remain in planes which are accurately parallel, which is extremely difficult to realise, especially taking normal manufacturing tolerances into account, where the valve seats are required to move relative to one another and one is supported by the structure of the other. Thus, in the valve closure member 50, by making the inner valve disc 56 capable of rocking relative to the outer valve carrier 52, the invention enables the disc 56 to adjust its closure position against the seat 36 in such a way as to compensate for any lack of parallelism between the seats 32 and 36. In this way, it is ensured that efficient closure of both valve closure parts 54 and 56 can occur simultaneously.

Turning now to FIGS. 2 and 3, wherein similar reference numerals are employed to denote similar parts where appropriate, the booster shown in FIGURE 2 is for the most part of similar construction to the booster of FIGURE 1, the major difference being that the closure member is of the type shown in FIG. 3. In the booster of FIG. 2 the hollow nut 42 is of slightly different construction to that of FIG. 1 and comprises a threaded portion 102 and a dished portion 104 which is held against a step 106 in the internal face of the sleeve 26 by the threaded portion 102. The ball end of the input rod 44 seats within the dished portion of the member 104. The passage 46 is formed in the member 104 and connects the hollow interior of the threaded portion 102 with the space 48. The sleeve 34 in this embodiment is constructed so as to carry out both the function of the sleeve 34 of the booster shown in FIGURE 1 and the function of the blind nut 60 of the booster of FIGURE 1. A passageway 61 is formed in the left hand end of the sleeve 34. The push rod 62 adapted to engage the piston of the master cylinder (not shown) is rigidly attached to the sleeve 34 at its left hand end. A vacuum connection 15 is provided on the shell 12 of the booster 10.

The valve closure member 50 (which is more clearly shown in FIGURE 3) comprises a disc-shaped carrier member 108 presenting a resilient front face 110 for sealing against valve seat 36 which, as can be seen from FIGURE 2, is of slightly different shape from the valve seat 36 of the embodiment shown in FIGURE 1. The disc-shaped member 108 has a projecting shank 114, the end of which is formed as a ball end 116. Attached to this ball end 116 as a press fit is a second (or outer) valve closure member 130 which is formed with a socket 120 for co-operation with the ball end 116. The valve closure member 130 is arranged for sealing against valve seat 32 formed on seating member 122. The seating member 122 has a central orifice 118 and thus the shank 114, may be slid back and forth relative to the seating member 122. The shank 114 is provided with a number of radially extending ribs 126 which co-operate with a hole formed in guide washer 124. The guide washer 124 does not extend up to the shank 114 and a number of gaps are thus defined by the ribs 126, the shank 114 and the guide washer 124. The guide washer 124 together with the seating member 122 seat against a step 128 formed in the outer sleeve 26 and thus serve to reduce the size of the internal passage through the sleeve 26. As can be seen from FIG. 2 a spring 51 is located in the space 48 and bears against the second valve closure member 130.

In the operation of the booster shown in FIGS. 2 and 3 of the drawings, with the brake pedal released and the input member 44 in its most retracted position, the outer sleeve 26 of the valve assembly is similarly in its most retracted position and the outer closure member 130 of the valve closure member 50 is held against the valve seat 32 by means of spring 51 in the space 48. The guide washer 124, and seating member 122, are seated against the step 128 and remain in this position throughout the operation of the booster.

The inner valve closure part 108 is held away from its seat 136. Under these circumstances, since the fluid chamber 20 communicates with the interior of the boss 22, it is further connected with the chamber 18 by way of open inner valve 36, 108 the interior of the sleeve 34 and the passage 61 in the sleeve 34, and both chambers 18 and 20 are therefore connected to a vacuum through the vacuum connection 15 on the shell 12. In this condition the booster is said to be vacuum suspended. This is the condition illustrated in FIG. 2.

When the brake pedal is pressed, the input member 44 moves to the left in the drawing taking the sleeve 26 with it, and moving inner valve closure part 108 towards its valve seat 36. A stage is eventually reached at which the inner valve closure part 108 seats against its valve seat 36 and thus both the inner and the outer valve closure parts are in engagement with their respectively co-operating valve seats 36 and 32. The two fluid chambers 18 and 20 are thus isolated from one another. In this position relative rocking or tilting between the inner and outer closure members is possible by virtue of the press-fit connection between the ball end 116 and the outer valve closure member 130. Thereafter upon further depression of the brake pedal the sleeve 26 is moved so far to the left that, although the inner valve 36, 108 remains closed the outer valve opens by virtue of the member 130 remaining in position while the sleeve 26 moves to the left taking with it members 122 and 124, thus uncovering the gaps defined by the guide washer 124, the ribs 126 and the shank 114. The chamber 20 is thus connected with atmospheric pressure through the interior of boss 22 the open valve, space 48 and passage 46 in the member 104. The chamber 18 remains connected to vacuum through the vacuum connection and a pressure differential is thus created between the two sides of the elastic diaphragm 16. The elastic diaphragm thus moves to the left and together with the input applied to the member 44, applies a brake operating force to the master cylinder piston. It will be noted that should the booster fail to operate a braking force is still transmitted to the master cylinder piston by input member 44 through the radial portion 40. It will also be appreciated that while the braking force is being applied as discussed above the deformable plate 70 will fulcrum about the lip 72 of the dished plate 68. This lip 72 is arranged to be radially inside the annulus representing the centre of pressure on the diaphragm 16, with the result that, when the plate deforms, there is a reaction fed back to the input member 44 through the outer sleeve 26 which indicates to the operator the degree to which the booster has been energized; in other words, it provides what is commonly known as "feel."

By making the inner valve closure member 108 capable of rocking relative to the outer valve closure member 130, the invention enables the inner valve closure member to adjust its closure position against the seat 36 in such a way as to compensate for any lack of parallelism between the seats 32 and 36. In this way it is ensured that efficient closure of both valve closure parts 108 and 130 can occur simultaneously.

Although the invention has been illustrated as embodied in a mechanical booster, it will be clear that by simple modification of the input member 44 it could be used in a hydraulic booster.

I claim:
1. A coaxial fluid flow control valve assembly comprising a first valve seat, a second valve seat arranged coaxially with said first valve seat and a common closure member arranged for co-operation with said valve seats, wherein said common closure member comprises a first valve closure member arranged for co-operation with said first valve seat, a second valve closure member arranged for co-operation with said second valve seat and press-fit connection means connecting said first and second valve closure members, said press-fit connection allowing rocking of said first valve closure member relative to said second valve closure member.

2. A coaxial fluid flow control valve assembly according to claim 1, wherein said press-fit connection means comprises a male member formed on one of said first and second valve closure members and a female member formed on the other of said first and second valve closure members.

3. A coaxial fluid flow control valve assembly according to claim 1, wherein said press-fit connection means is of the ball and socket type.

4. The assembly of claim 1 including a fluid pressure servo motor, concentric inner and outer components movable relatively to each other for controlling energization of said motor, said inner component comprising a thrust member connected to a work performing member of the motor and carrying said first valve seat, said outer component comprising a sleeve member slidable on said thrust member and being connected to a control member, said sleeve member supporting said second valve seat, a circumferential recess in said thrust member, and a radial inwardly extending abutment member carried by said sleeve member and received in said recess, said abutment member having a lesser width than that of said recess whereby said control member may be mechanically connected to said work performing member for direct transmission of mechanical effort between the two upon engagement of a side wall of said recess by said radial inwardly extending abutment member.

5. A servo motor comprising a first fluid chamber, a second fluid chamber adjacent said first fluid chamber, a movable wall common to both said first and second fluid chambers, said movable wall being capable of delivering the motor output, a control valve according to claim 1 connected to one said fluid chambers, a number of sources of differential fluid pressure selectively connectable to said one of said fluid chambers by said control valve, an input to said motor connected to said control valve and arranged to effect relative displacement between the valve seats of said control valve for selectively placing said one chamber in communication with said fluid pressure sources.

6. A coaxial fluid flow control valve assembly comprising a first valve seat, a second valve seat arranged coaxially with said first valve seat and a common closure member arranged for co-operation with said valve seats, wherein said common closure member comprises a dish shaped annular carrier member, a resilient face on said carrier member for sealing against one of said valve seats, an upstanding stud formed on the centre of said carrier member a disc-shaped valve closure member arranged for co-operation with the other of said valve seats, a dimple centrally formed in said disc-shaped valve closure member and engaged as a rockable press-fit connection over said upstanding central stud.

7. A coaxial fluid flow control valve assembly according to claim 6, wherein said press-fit connection is of ball and socket connection.

8. A servo-motor comprising a first fluid chamber, a second fluid chamber adjacent said first fluid chamber, a movable wall common to both said first and second fluid chambers, said movable wall being capable of delivering the motor output, a control valve according to claim 6 connected to one said fluid chambers, a number of sources of differential fluid pressure selectively connectable to said one of said fluid chambers by said control valve, an input to said motor connected to said control valve and arranged to effect relative displacement between the valve seats of said control valve for selectively placing said one chamber in communication with said fluid pressure sources.

9. A coaxial fluid flow control valve assembly comprising a first valve seat, a second valve seat arranged coaxially with said first valve seat and a common closure member arranged for co-operation with said second valve seats, wherein said common closure member comprises a first valve closure member, arranged for co-operation with one of said pair of valve seats, a shank extending from said first valve closure member, a second valve closure member for co-operation with the other of said pair of valve seats, and press-fit connection means connecting said first and second valve closure members allowing rocking of said first valve closure member relative to said second valve closure member, and wherein a seating member is disposed on said shank as a loose fit, a valve orifice being formed in said seating member and said other of said valve seats being formed on said seating member.

10. A coaxial fluid flow control valve assembly according to claim 9, wherein said first valve closure member comprises a disc-shaped carrier member and a resilient face on said carrier member for sealing against said valve seat.

11. A coaxial fluid flow control valve assembly according to claim 9, wherein a number of radially extending ribs are formed on said shank, a guide washer is disposed as a slidable fit on said shank, a number of radially extending slots are formed in said guide washer for co-operation with said ribs and a number of gaps are formed adjacent said shank and defined by said ribs, said shank and said guide washer to allow passage of fluid therethrough.

12. A coaxial fluid flow valve assembly according to claim 9 wherein said press-fit connection means comprises a male member formed on said shank and a female member formed in said second valve closure member.

13. A coaxial fluid flow control valve assembly according to claim 9, wherein said press-fit connection is of ball and socket construction.

14. A servo-motor comprising a first fluid chamber, a second fluid chamber adjacent said first fluid chamber, a movable wall common to both said first and second fluid chambers, said movable wall being capable of delivering the motor output, a control valve according to claim 9 connected to one said fluid chambers, a number of sources of differential fluid pressure selectively connectable to said one of said fluid chambers by said control valve, an input to said motor connected to said control valve and arranged to effect relative displacement between the valve seats of said control valve for selectively placing said one chamber in communication with said fluid pressure sources.

References Cited
UNITED STATES PATENTS

| | | | |
|---|---|---|---|
| 1,854,370 | 4/1932 | Droege | 251—86 |
| 2,479,688 | 8/1949 | Lindgren | 251—86 |
| 3,013,536 | 12/1961 | Cripe | 91—376 |
| 3,073,563 | 1/1963 | Meyer et al. | 251—86 |
| 3,175,235 | 3/1965 | Randol | 91—376 |
| 3,289,547 | 12/1966 | Kytta | 91—376 |
| 3,177,777 | 4/1965 | Kenrick | 91—391 |

PAUL E. MASLOUSKY, *Primary Examiner.*

U.S. Cl. X.R.

91—391; 92—94; 137—627.5, 596.2; 251—86